Patented Jan. 27, 1931

1,790,070

UNITED STATES PATENT OFFICE

CHARLES EDWARD OLIVER, OF PENTICTON, BRITISH COLUMBIA, CANADA

PROCESS FOR THE MANUFACTURE OF CONCENTRATED EMULSIONS OF OIL AND WATER

No Drawing.    Application filed April 5, 1926.   Serial No. 99,986.

This invention relates to a method of making an emulsion of oil and is designed to simplify and cheapen the preparation of such oil emulsions as are marketed for tree and plant spraying.

The method comprises certain steps in the process of manufacture, which to obtain satisfactory results, should be closely followed.

The oil to be emulsified is first thickened with a certain amount of rosin, which presumably has the effect of increasing its surface tension: A certain amount of water is then prepared for emulsification by dissolving in it a certain proportion of commercial casein. This decreases the surface tension of the water to approximately that of the oil and rosin mixture.

The surface tension of the prepared oil and of the prepared water being rendered approximately alike, when mixed together they will freely emulsify.

Equal parts of the prepared oil and water are then mixed and stirred to bring them intimately in contact with one another when they freely emulsify, that is, without the customary requirement of vigorous agitation and form a concentrated and stable emulsion of oil and water.

The concentrated emulsion has the property of emulsifying a further very considerable quantity of oil and water, provided the additional oil and water are separately and progressively added in the proper proportions such as is set forth in the following specification.

The preparation of the oil and water to be emulsified in the production of the primary concentrated emulsion is as follows:

10 pounds of rosin are dissolved in 5 gallons of oil, heating, if necessary, to more readily effect solution.

Simultaneously, 10 pounds of commercial casein are dissolved in 10 gallons of water, in which 1 pound of caustic soda or other alkaline solvent has been dissolved. These amounts are only empirical as the proportions may with practice be greatly varied.

Equal parts of the oil and the water so prepared are then mixed together by stirring or paddling, and without further mechanical or other agitation, they immediately emulsify to a pasty consistency. This concentrated emulsion has the property of emulsifying, also without great agitation, a very much larger volume of oil and water.

This separate preparation of the oil and the water with the ingredients named, or their equivalents, to approximately equalize their surface tension and thereby facilitate emulsification, and the concentrated emulsion resulting from their mixture constitutes the first and most important feature of the invention.

This concentrated emulsion is then thinned down by the addition of a small quantity of water and to the thinned emulsion, oil is added in a volume approximately three times that of the water. When this oil is added the water-thinned emulsion immediately thickens and whitens, showing that the added oil has been emulsified.

The emulsion is then thinned down by the addition of a further larger quantity of added water, and the corresponding further supply of oil is added in the ratio of three times the water. This further supply of oil is at once emulsified.

This separate addition of successive increasing quantities of water and oil in the approximate ratio of one of water to three of oil is continued until the desired fluidity of the emulsion is attained.

With experience in manipulation, the primary concentrated emulsion will effect the emulsion of one hundred times its own volume of water and oil, that is to say, the final emulsion may contain 1 volume of the primary emulsion, 25 volumes of water and 75 volumes of oil.

The procedure of first effecting a concentarted emulsion that will form a starter from which a considerably larger volume of water and oil may subsequently be emulsified and the process of such emulsification, I regard as further novel and advantageous features of the invention.

In the foregoing I have specified the use of commercial casein as it appears to contain impurities, that accelerate the action of emulsification. A good accelerating result can be obtained by the use of say one gallon of buttermilk, or one ounce of lactic, salicylic, or benzoic acid may be added to the water in which the casein is dissolved.

Having now particularly described my invention, I hereby declare that what I claim as new and desire to be protected in by Letters Patent, is:

1. The method of preparing a concentrated emulsion which consists in separately preparing two substances, one a mixture of oil and rosin and the other a solution of casein in water, and then adding the separately prepared substances together.

2. The method of preparing concentrated emulsion which consists in first preparing a substance by taking oil and thickening it with rosin, separately preparing another substance by dissolving casein in water and then mixing equal parts of the two substances together.

3. The method of preparing a concentrated emulsion which consists in separately preparing two substances, one of which consists of oil and rosin and the other of water and casein to bring the surface tension of the respective substances to an approximate equality and then mixing together substantially equal parts of the two substances.

4. In the method of preparing a concentrated emulsion, the steps of preparing oil with rosin and water with casein until the surface tensions are substantially equal.

5. The method of preparing concentrated emulsion which consists in treating oil with rosin, separately preparing a solution of water and casein and then mixing the two prepared liquids together to form a primary emulsion, and alternately mixing water and oil with said primary emulsion.

6. The method of preparing concentrated emulsion which consists in first separately preparing two substances, one composed of oil and rosin in the proportions approximately of five gallons of oil to ten pounds of rosin, the other composed of water and casein in the proportion of approximately ten pounds of casein to ten gallons of water, and then mixing together equal parts of the two substances.

In testimony whereof I affix my signature.

CHARLES EDWARD OLIVER.